US011521344B2

(12) United States Patent
Hughes et al.

(10) Patent No.: US 11,521,344 B2
(45) Date of Patent: Dec. 6, 2022

(54) IMAGE RENDERING USING RAY-TRACING

(71) Applicant: Sony Interactive Entertainment Inc., Tokyo (JP)

(72) Inventors: Colin Jonathan Hughes, London (GB); Maurizio Cerrato, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/361,484

(22) Filed: Jun. 29, 2021

(65) Prior Publication Data

US 2022/0005256 A1 Jan. 6, 2022

(30) Foreign Application Priority Data

Jul. 1, 2020 (GB) ..................................... 2010048

(51) Int. Cl.
*G06T 15/06* (2011.01)
*G06T 7/70* (2017.01)
*G06T 15/40* (2011.01)

(52) U.S. Cl.
CPC .............. *G06T 15/06* (2013.01); *G06T 7/70* (2017.01); *G06T 15/40* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 10,970,914 B1* | 4/2021 | Clark | G06T 15/005 |
| 2017/0372508 A1 | 12/2017 | Schoeneman | |
| 2019/0088002 A1* | 3/2019 | Howson | G06T 15/20 |
| 2019/0318529 A1 | 10/2019 | Hunt | |
| 2020/0380763 A1* | 12/2020 | Abramov | G06T 5/50 |

FOREIGN PATENT DOCUMENTS

GB 2410663 A 8/2005

OTHER PUBLICATIONS

Combined Search and Examination Report for corresponding GB Application No. GB2010048.3, 5 pages, dated Dec. 2, 2020.
Ulrich Haar, et al., "GPU-Driven Rendering Pipeline," Siggraph 2015—Advances in Real-Time Rendering in Games, The 42nd International Conference and Exhibition on Computer Graphics and Interactive Techniques, 60 pages, Jan. 1, 2015.

* cited by examiner

*Primary Examiner* — Nurun Flora
(74) *Attorney, Agent, or Firm* — Matthew B. Dernier, Esq.

(57) ABSTRACT

A method of rendering an image includes generating a virtual scene comprising a set of virtual resources, the virtual resources being virtual objects and/or virtual light sources; pre-processing the virtual scene by ray-tracing with respect to a virtual camera position to detect one or more virtual resources not required for ray-tracing rendering of at least an aspect of rendering the image; and rendering the image by a ray-tracing process from the virtual camera position, the ray-tracing process being configured to omit ray-tracing for at least a given aspect of the image, with respect to the one or more virtual resources not required for ray-tracing rendering of at least the given aspect of the image.

10 Claims, 6 Drawing Sheets

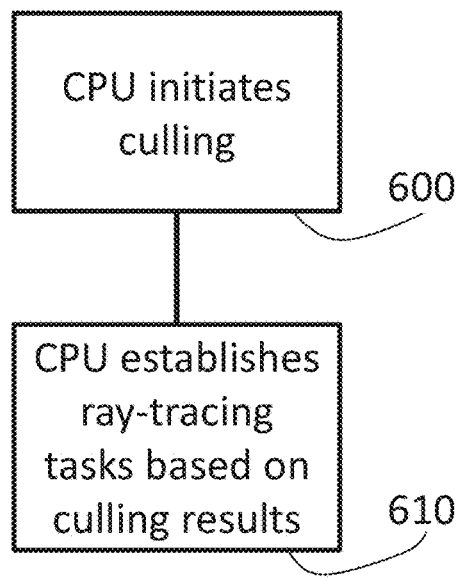
Fig. 6
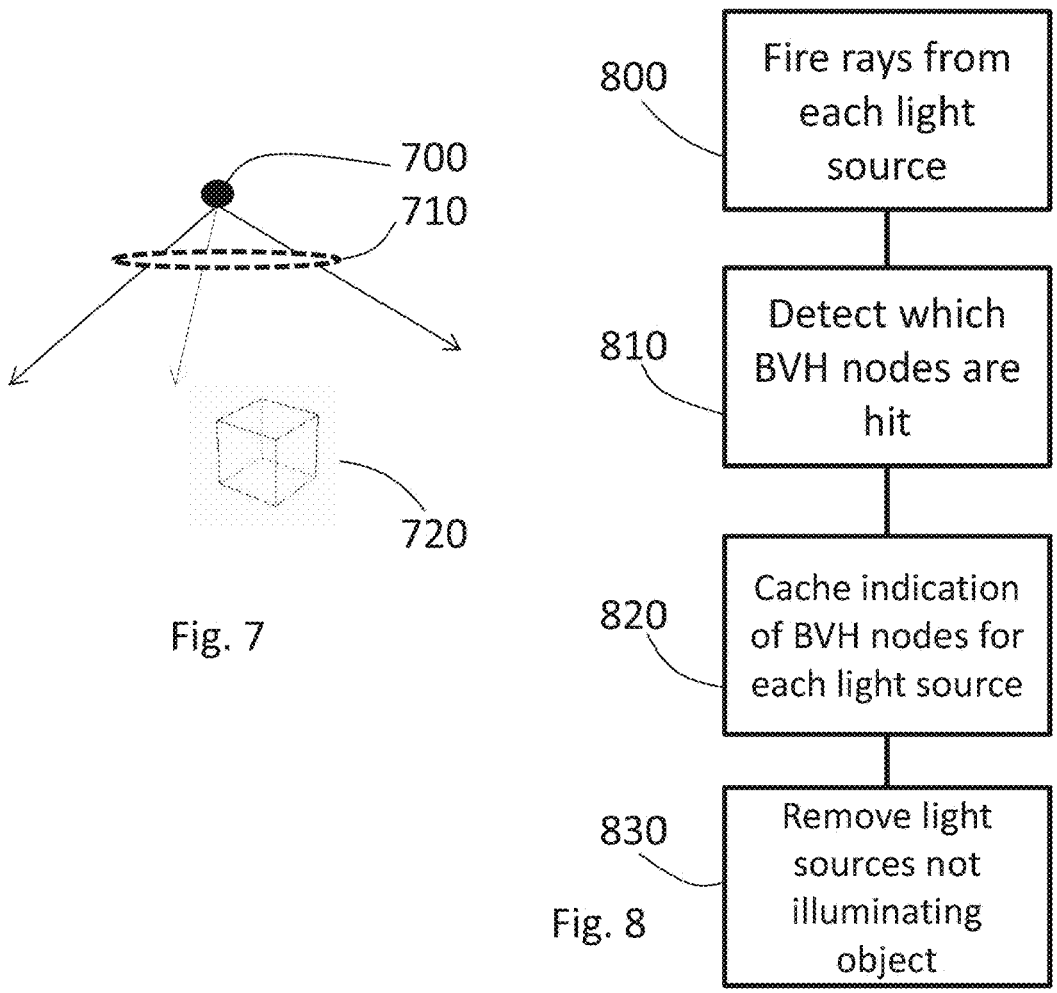
Fig. 7
Fig. 8

IMAGE RENDERING USING RAY-TRACING

BACKGROUND

This disclosure relates to image rendering using ray-tracing.

Image rendering may be performed using a technique referred to as ray-tracing. This is a technique to generate pixels or samples of an image by tracing so-called rays or light paths and simulating the effects of light encountering objects in the scene being viewed. It can be used as an alternative to other forms of rendering such as so-called scanline rendering.

In a physical reality, light from a light source hits an object and is reflected and/or refracted towards the viewing position such as a user's eye or a camera. In contrast, in rendering systems using ray-tracing, the simulation is performed by emitting virtual or simulated "rays" from the viewing position such as a virtual camera and determining what interactions they undergo when they hit an object or a light source (the latter being either directly or after having hit an object.

The processing requirements of ray-tracing can be high but in some example systems, dedicated ray-tracing hardware can be provided.

SUMMARY

It is in this context that the present disclosure arises.

The present disclosure provides a method of rendering an image, the method comprising:

generating a virtual scene comprising a set of virtual resources, the virtual resources being virtual objects and/or virtual light sources;

pre-processing the virtual scene by ray-tracing with respect to a virtual camera position to detect one or more virtual resources not required for ray-tracing rendering of at least an aspect of rendering the image; and rendering the image by a ray-tracing process from the virtual camera position, the ray-tracing process being configured to omit ray-tracing for at least a given aspect of the image, with respect to the one or more virtual resources not required for ray-tracing rendering of at least the given aspect of the image.

The present disclosure also provides image rendering apparatus comprising:

a generator to generate a virtual scene comprising a set of virtual resources, the virtual resources being virtual objects and/or virtual light sources;

a pre-processor to pre-process the virtual scene by ray-tracing with respect to a virtual camera position to detect one or more virtual resources not required for ray-tracing rendering of at least an aspect of rendering the image; and a renderer to render the image by a ray-tracing process from the virtual camera position, the ray-tracing process being configured to omit ray-tracing for at least a given aspect of the image, with respect to the one or more virtual resources not required for ray-tracing rendering of at least the given aspect of the image.

Various further aspects and features of the present disclosure are defined in the appended claims and within the text of the accompanying description.

BRIEF DESCRIPTION OF THE DRAWING

FIG. 6 is a schematic flowchart illustrating a method;

FIG. 7 schematically illustrates a lighting culling technique;

FIG. 8 is a schematic flowchart illustrating a method;

EXAMPLE HARDWARE AND SOFTWARE OVERVIEW

Figure 1:
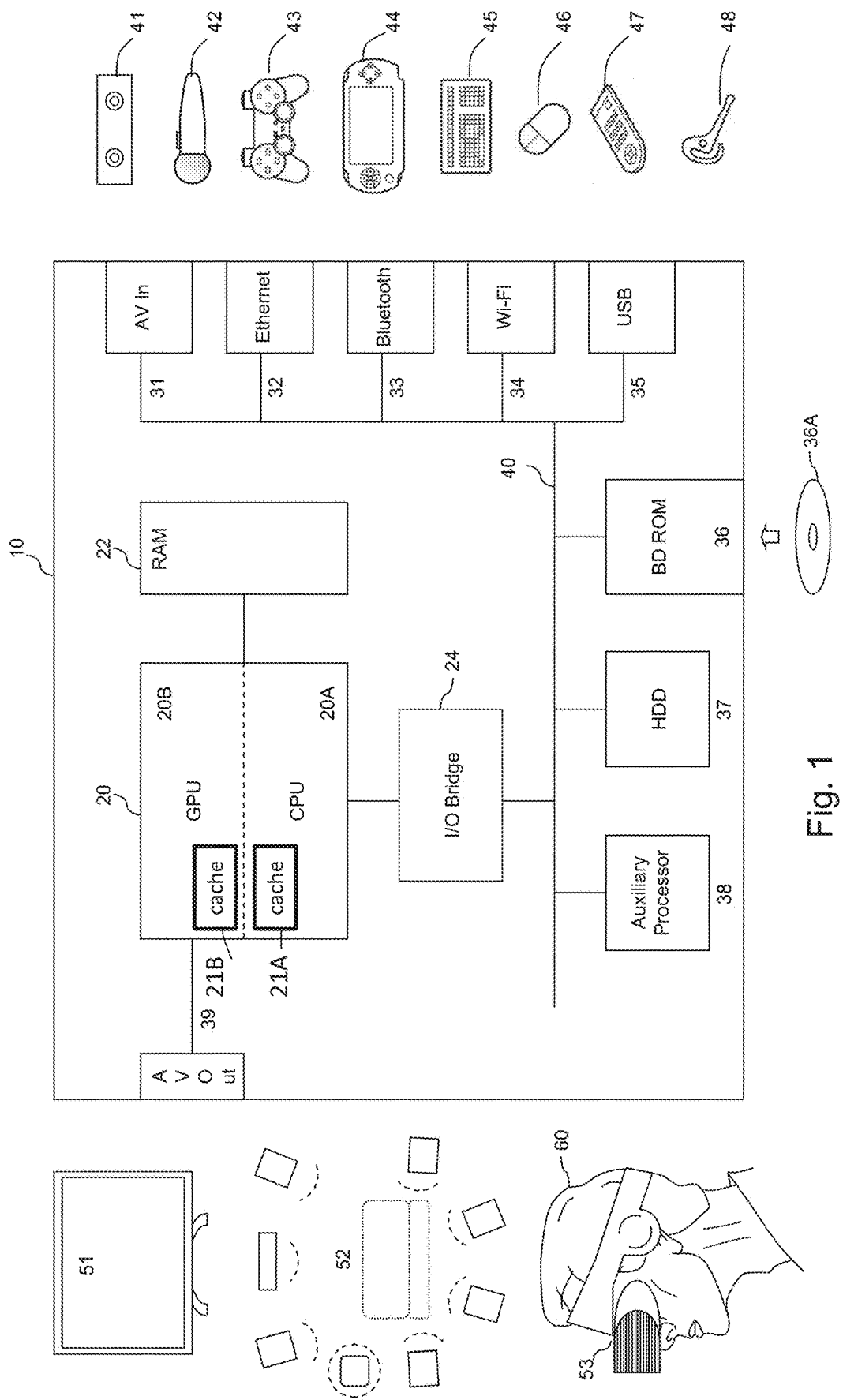
FIG. 1 schematically illustrates an example entertainment device.

Referring now to the drawings, FIG. 1 schematically illustrates the overall system architecture of an example entertainment device such as a games console. A system unit 10 is provided, with various peripheral devices connectable to the system unit.

The system unit 10 comprises a processing unit (PU) 20 that in turn comprises a central processing unit (CPU) 20A and a graphics processing unit (GPU) 20B. The PU 20 has access to a random access memory (RAM) unit 22. One or both of the CPU 20A and the GPU 20B may have access to a cache memory, which may be implemented as part of the respective device and/or as a portion of the RAM 22.

The PU 20 communicates with a bus 40, optionally via an I/O bridge 24, which may be a discrete component or part of the PU 20.

Connected to the bus 40 are data storage components such as a hard disk drive 37 (as an example of a non-transitory machine-readable storage medium) and a Blu-ray® drive 36 operable to access data on compatible optical discs 36A. In place of or in addition to the hard disk drive 37, a so-called solid state disk device (which is a solid state device which is formatted to mimic a hard drive's storage structure in operation) or a flash memory device may be used. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In more detail, regarding processing, the CPU 20A may comprise a multi-core processing arrangement, and the GPU 20B may similarly provide multiple cores, and may include dedicated hardware to provide so-called ray-tracing, a technique which will be discussed further below. The GPU cores may also be used for graphics, physics calculations, and/or general-purpose processing.

Optionally in conjunction with an auxiliary audio processor (not shown), the PU 20 generates audio for output via the AV output 39. The audio signal is typically in a stereo format or one of several surround sound formats. Again this is typically conveyed to the television 51 via an HDMI® standard connection. Alternatively or in addition, it may be conveyed to an AV receiver (not shown), which decodes the audio signal format and presented to a home cinema system 52. Audio may also be provided via wireless link to the headset 48 or to the hand-held controller 43. The hand held controller may then provide an audio jack to enable headphones or a headset to be connected to it.

Finally, as mentioned above the video and optionally audio may be conveyed to a head mounted display 53 such as the Sony® PSVR display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

In operation, the entertainment device may operating under the control of an operating system which may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

Upon start-up, respective users are asked to select their respective accounts using their respective controllers, so that optionally in-game achievements can be subsequently accredited to the correct users. New users can set up a new account. Users with an account primarily associated with a different entertainment device can use that account in a guest mode on the current entertainment device.

Once at least a first user account has been selected, the OS may provide a welcome screen displaying information about new games or other media, and recently posted activities by friends associated with the first user account.

When selected via a menu option, an online store may provide access to game software and media for download to the entertainment device. A welcome screen may highlight featured content. When a game is purchased or selected for download, it can be downloaded for example via the Wi-Fi connection 34 and the appropriate software and resources stored on the hard disk drive 37 or equivalent device. It is then copied to memory for execution in the normal way.

A system settings screen available as part of the operation of the operating system can provide access to further menus enabling the user to configure aspects of the operating system. These include setting up an entertainment device network account, and network settings for wired or wireless communication with the Internet; the ability to select which notification types the user will receive elsewhere within the user interface; login preferences such as nominating a primary account to automatically log into on start-up, or the use of face recognition to select a user account where the video camera 41 is connected to the entertainment device; parental controls, for example to set a maximum playing time and/or an age rating for particular user accounts; save data management to determine where data such as saved games is stored, so that gameplay can be kept local to the device or stored either in cloud storage or on a USB to enable game progress to be transferred between entertainment devices; system storage management to enable the user to determine how their hard disk is being used by games and hence decide whether or not a game should be deleted; software update management to select whether or not updates should be automatic; audio and video settings to provide manual input regarding screen resolution or audio format where these cannot be automatically detected; connection settings for any companion applications run on other devices such as mobile phones; and connection settings for any portable entertainment device 44, for example to pair such a device with the entertainment device so that it can be treated as an input controller and an output display for so-called 'remote play' functionality.

The user interface of the operating system may also receive inputs from specific controls provided on peripherals, such as the hand-held controller 43. In particular, a button to switch between a currently played game and the operating system interface may be provided. Additionally a button may be provided to enable sharing of the player's activities with others; this may include taking a screenshot or recording video of the current display, optionally together with audio from a user's headset. Such recordings may be uploaded to social media hubs such as the entertainment device network, Twitch®, Facebook® and Twitter®.

Ray-Tracing

Figure 2:
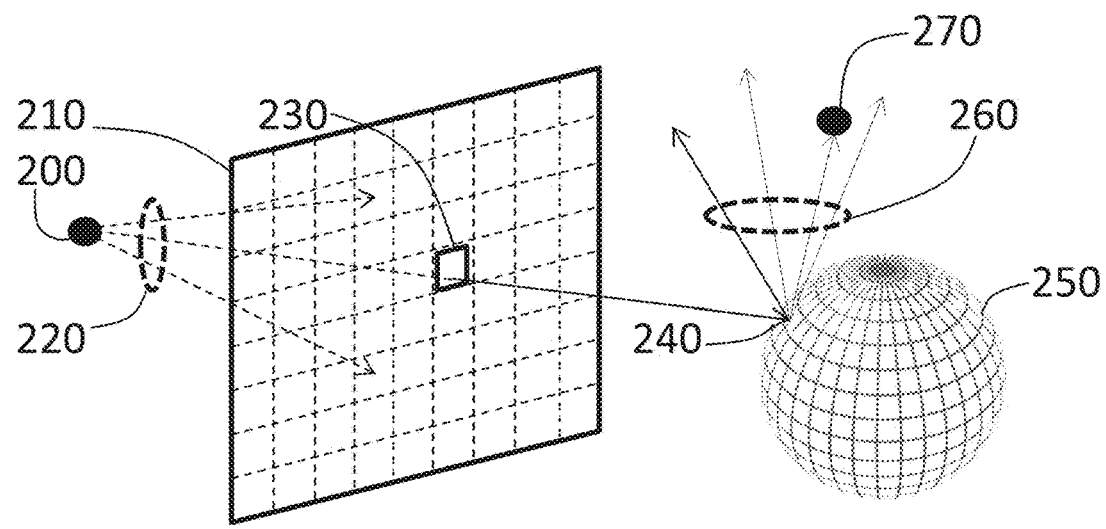
FIG. 2 schematically illustrates a perspective view of a so-called ray-tracing arrangement.
Figure 3:
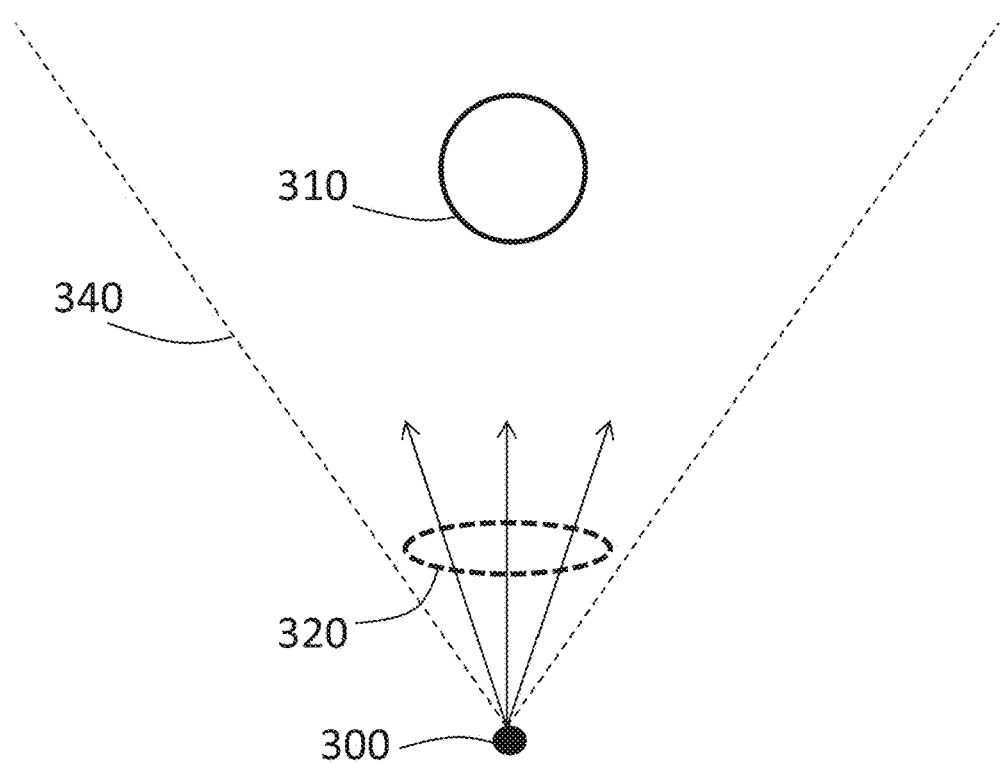
FIG. 3 schematically illustrates a plan view of the arrangement of FIG. 2.

FIGS. 2 and 3 provide schematic representations of a technique referred to as ray-tracing. This is a technique used during image rendering to generate pixels or samples of an image by tracing so-called rays or light paths and simulating the effects of light encountering objects in the scene being viewed. It can be used as an alternative to other forms of rendering such as so-called scanline rendering. The processing requirements can be high but in example apparatus such as that shown in FIG. 1, dedicated ray-tracing hardware can be provided.

In a physical reality, light from a light source hits an object and is reflected and/or refracted towards the viewing position such as a user's eye or a camera. In contrast, in rendering systems using ray-tracing, the simulation is performed by emitting virtual or simulated "rays" from the viewing position such as a virtual camera and determining what interactions they undergo when they hit an object or a light source (the latter being either directly or after having hit an object.

Referring to FIG. 2, a virtual camera 200 is viewing a virtual object 250 in a virtual environment as modelled, in order to generate a rendered image 210 formed of multiple pixels such as a pixel 230. In this technique, multiple virtual rays 220 are emitted from the virtual camera 200, passing through pixel positions such as the position of the pixel 230 in the image 210 to be rendered. In some cases the virtual rays impact a virtual object, for example at a position 240. At this point on the virtual object 250, the object surface's colour, orientation, reflectivity and other optical properties are taken into account. A further set of virtual rays 260 is emitted from the point 240 to detect whether any of those virtual rays 260 impact a light source or indeed another object. If they do impact a light source such as an example light source 270, properties of that light source are used to determine the lighting incident upon the location 240. In other examples, if the rays 260 impact another object, then depending upon the optical properties of the location 240 and its orientation, a reflection of that other object may be rendered at the surface of the object 250.

FIG. 3 represents a similar arrangement in a schematic plan view, where the virtual camera 300 emits virtual rays 320 towards an object 310 within a field of view or "frustum" 340.

As described, the ray-tracing process can be very computationally expensive and require powerful computing resources to carry out, particularly where the virtual scene includes many virtual objects and virtual light sources. Each virtual ray must be tested as to whether it intersects with each object in the scene.

Bounding Volume Hierarchies

Figure 4:
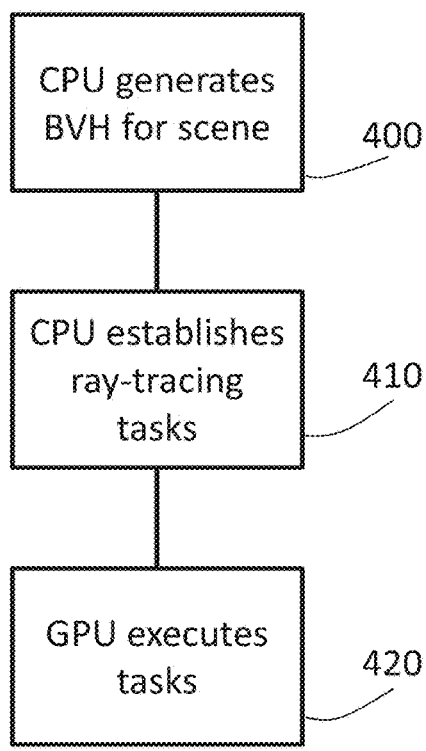
FIG. 4 is a schematic flowchart illustrating a method.
Figure 5:
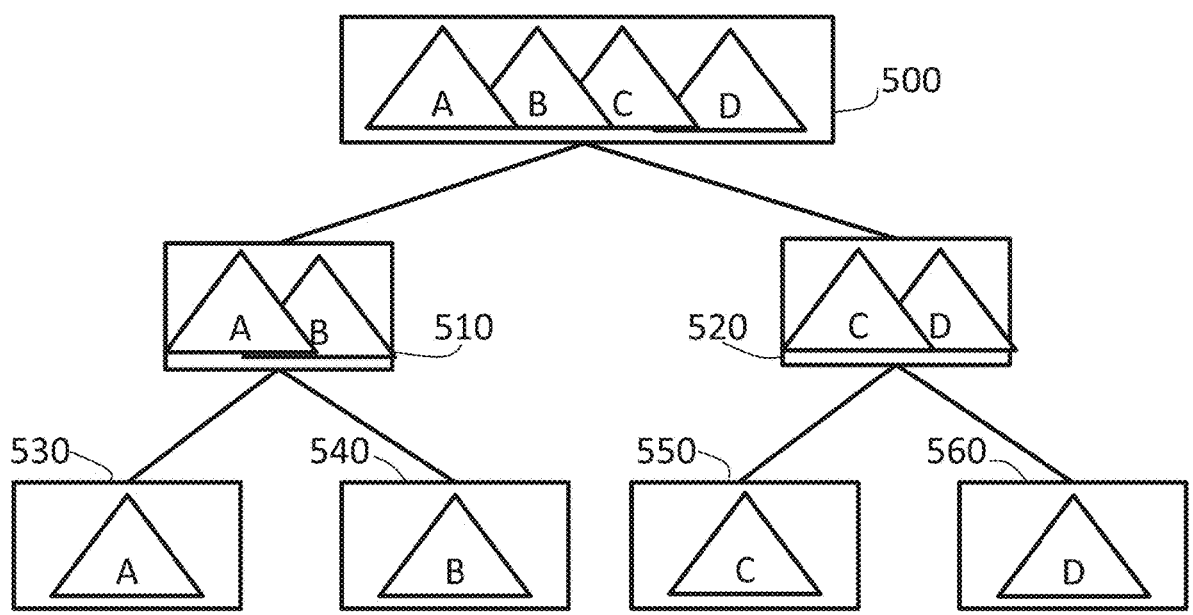
FIG. 5 schematically illustrates an example bounding volume hierarchy (BVH)

So-called bounding volume hierarchies (BVHs) will now be described briefly with reference to FIGS. 4 and 5. FIG. 4 provides an overview of the generation of a BVH and FIG. 5 provides a schematic example of a BVH itself.

A BVH is a hierarchical tree structure of volumes which provides a way of representing objects within a virtual environment. Each geometric object in the generated virtual environment is contained within or "wrapped" in a bounding volume forming the lowest level or "leaf nodes" of the tree structure. In FIG. 5, four example geometric objects A, B, C, D are represented, with each having a respective leaf node 530, 540, 550, 560 providing a definition of a bounding volume containing just that geometric object. At a next higher level, the leaf nodes are grouped as small localised sets of leaf nodes and are enclosed within a larger bounding volumes defined by tree structure nodes 510, 520. These in turn are recursively grouped and enclosed within other, more extensive, bounding volumes defined by higher level nodes such as a node 500 of FIG. 5. Ultimately, there will be a single bounding volume as a highest level node in the tree structure.

Referring back to FIG. 4, the processes involved in rendering an image can be carried out by the CPU 20A and/or the GPU 20B, for example with each having a respective category of roles within the overall process. Typically, in a real-time system such as a computer games machine of the type shown in FIG. 1, the rendering tasks associated with generating a single output image or frame have to be completed within a frame period, or at least the system has to be capable of outputting one frame at each frame period.

At a schematic step 400, modelling of the virtual scene may be performed by the CPU 20A which generates the geometric objects within the virtual scene and assigns them to nodes within a BVH. At a step 410, the CPU 20A establishes a set of ray-tracing tasks and communicates these to the GPU 20B which then executes the ray-tracing tasks at a step 420. This arrangement is purely by way of example and this particular division of processing effort between the CPU 20A and the GPU 20B is purely one example of how this may be done.

Culling of Ray-Tracing Tasks

Example arrangement will now be described by which some of the ray-tracing processing can be reduced or "culled" so as to provide for greater efficiency by at least potentially allowing the PU 20 to avoid executing ray-tracing operations which are predicted (by the culling process) not to lead to results which are useful in rendering the required output image.

In an example schematic flowchart of FIG. 6, at a step 600 the CPU 20A initiates a culling process. This may be performed by the CPU 20A itself or the CPU may instruct the GPU 20B to perform at least part of the culling process. Then, in place of the step 410 of FIG. 4, at a step 610 the CPU establishes ray-tracing tasks based on the culling results. Control then passes to the step 610 as discussed above.

Example 1—Light Source Culling

In the basic ray-tracing arrangement discussed above, virtual rays are generated from a point of intersection with a virtual object and intersection with a light source is detected.

In contrast, in the example arrangement shown in FIG. 7 and described in a schematic flowchart of FIG. 8, a set 710 of virtual rays is emitted from a light source 700 into a virtual scene such as a virtual scene containing a bounding volume 720 containing geometric objects in the virtual scene.

In example arrangements, this process is carried out at a high level in the BVH tree, which is to say a level higher than the leaf nodes. For each such light source 700, a detection is made as to which objects (as expressed by their respective node in the BVH structure at the "high level" mentioned above) are intersected by these virtual rays. The set 710 of virtual rays can be at a lower resolution or angular and/or spatial density of virtual rays than would be used in the final generation of a rendered image. The results, expressed as a set of BVH nodes at the "high level" which are intersected by rays emanating from the light source 700, stored in cache memory storage such as the cache 21A, 21B for each light source in the virtual scene.

These results provide information indicating which geometric objects are at least potentially illuminated by each light source in the virtual scene.

Therefore, for a particular geometric object, the cached results information can be consulted so as to detect, in respect of the high-level BVH entry containing that geometric object, which light sources may at least potentially be illuminating that particular geometric object. Any other light sources can be culled from (omitted from) the ray-tracing process is applied to that particular geometric object.

In an extreme situation, where a particular light source has no BVH nodes associated with it in the cached results information, that light source can be removed altogether from the ray-tracing process of FIG. 2, and in particular, no detection needs to be made as to whether any of the rays 260 emanating from the example location 240 on the example virtual object 250 intersects that light source.

Therefore, in summary, a pre-processing stage involves emitting or firing rays from each light source to detect which BVH nodes at a high BVH level are intersected by those rays, which in turn allows light sources which cannot possibly be illuminating a given object in the scene to be eliminated from the remaining calculations and the full rendering process in respect of that given object.

Note that an intersection between a ray 710 and a bounding volume 720 does not in fact provide any guarantee that a geometric object within that bounding volume will be eliminated by the light source 700 from which that ray 710 is emitted. However, a lack of intersection between any of the rays 710 and the bounding volume 720 indicates that illumination cannot possibly be taking place for that bounding volume 720 and so the light source 700 can be cold or removed from consideration in the ray-tracing process carried out for any geometric object within that particular bounding volume 720.

In other words, the generation of the virtual scene may involve generating a bounding volume hierarchy, BVH, defining bounding volumes around the virtual objects of the set of virtual resources. Here, for example, each lowest level leaf node of the BVH defines a bounding volume around a single respective virtual object, and higher level nodes of the BVH define bounding volumes around respective groups of virtual objects. The pre-processing may comprise detecting, for each virtual light source, BVH nodes at a level higher than the leaf nodes which are intersected by a ray emanating from that virtual light source.

Referring to the schematic flowchart of FIG. 8, at a step 800 a set of rays is fired or emitted from each light source, for example each light source in turn (though parallel operation is also envisaged). This is carried out in respect of high-level (at least higher than leaf node) BVH nodes. In other words, the pre-processing comprises detecting, for each virtual light source, virtual objects which may be intersected by a ray emanating from that virtual light source.

At a step 810, a detection is made as to which BVH nodes are hit by such rays and information defining these "hits" for each light source is cached at a step 820, or in other words this involves storing BVH data indicative of any BVH nodes which are which are intersected by a ray emanating from that virtual light source. Then, for the subsequent "full" rendering of a given object in the scene, any light sources which the cached results information indicates cannot possibly be illuminating that given object, those light sources are removed from consideration at a step 830. In other words, the step 830 may involve for a given point of intersection of a ray with a given virtual object, emanating rays from that point; and detecting any virtual light sources intersected by those rays; in which the detecting step comprises omitting from the detection any light source not indicated by the stored BVH data, not to intersect the BVH node containing the given virtual object.

Example 2—Occlusion and Frustum Culling

Figure 9:
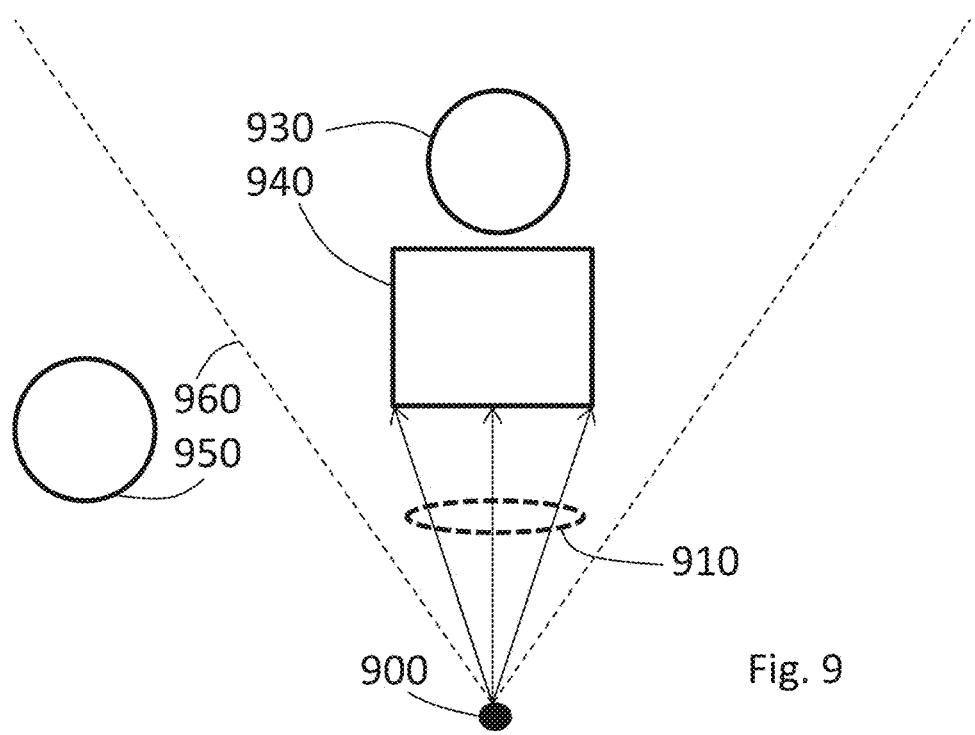
FIG. 9 schematically illustrates an object culling technique.

A second example is shown schematically in FIGS. 9 and 10, with FIG. 9 being a schematic plan view illustrating a virtual scene, similar to FIG. 3 described above, and FIG. 10 being a schematic flowchart illustrating a method.

Rather than culling light sources as described with reference to Example 1, this example arrangement culls object which cannot possibly be seen by the virtual camera and therefore cannot possibly form part of the rendered image.

Note that both processes may be performed in some example embodiments, that is to say the processes of Example 1 and Example 2 can both be performed as part of a pre-processing culling operation before a full ray-tracing process is performed to generate a rendered output image.

Referring to FIG. 9, in a similar notation to that used above, a virtual camera 900 is shown with objects 930, 940, 950 in a virtual scene. The culling process used here detects objects such as the objects 950 which are outside the frustum or field of view 960 of the virtual camera 900, and also object 930 which are entirely occluded behind other objects such as the objects 940.

Figure 10:
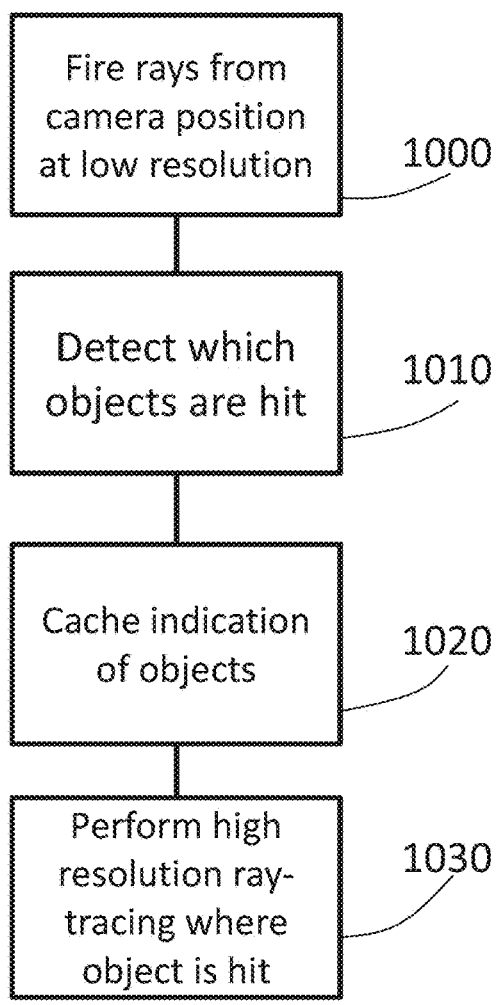
FIGS. 10 and 11 are schematic flowcharts illustrating respective methods.

Referring to the flowchart of FIG. 10, at a step 1000, virtual rays are fired from the camera 900 position at a low resolution, for example one ray per output pixel or less (or in other words, the ray-tracing of this pre-processing step employs a lower density of rays than the ray-tracing of the subsequent rendering step). A detection is made at a step 1010 as to which objects are hit. In other words, the pre-processing is configured to detect one or more virtual resources not required for ray-tracing rendering from that virtual camera position by detecting, using ray-tracing, whether one or more virtual resources are visible from that virtual camera position. If an object is hit by these low resolution rays, then the object will be visible within the eventual rendered image. If an object is not hit then it is not going to be visible in the eventual rendered image. An indication of which objects are visible is cached at a step 1020 (or in other words, the pre-processing comprises storing visibility data indicating of any virtual resources which are visible from the virtual camera location), and the step 1030 refers to performing the full rendering process using high resolution ray-tracing with respect to those objects which are hit in the culling process and which therefore are visible to the final rendered image (or in other words, the rendering comprises performing the ray-tracing process in respect of those virtual resources indicated by the stored visibility data to be visible from the virtual camera location).

As mentioned, the example objects 930 and 950 are not visible to the camera 900, because of occlusion or lying outside the camera frustum. The step 1020 can either record a positive indication of objects which are visible (which would then omit the objects 950, 930) or could record an indication of objects which are not visible (which would then comprise the objects 950, 930 and any other non-visible object from that camera 900 position).

Summary Method

Figure 11:
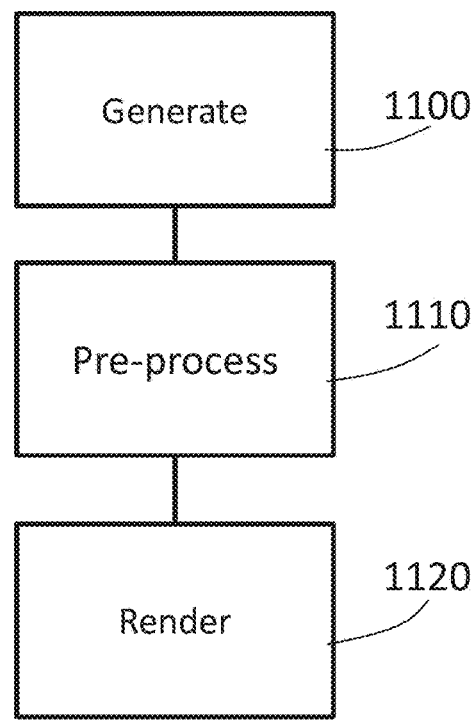
Figure 12:
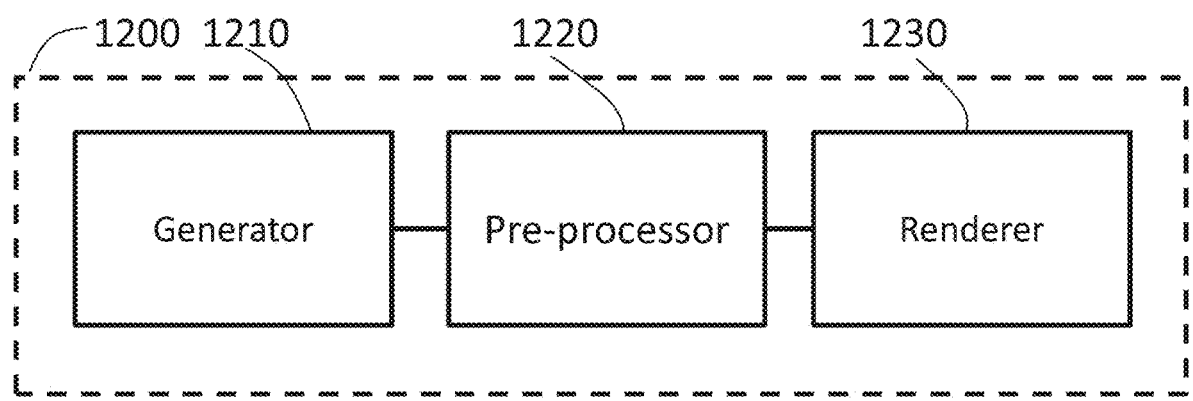
FIG. 12 schematically illustrates an apparatus.

FIG. 11 is a schematic flowchart illustrating a summary method of rendering an image, the method comprising: generating (at a step 1100) a virtual scene comprising a set of virtual resources, the virtual resources being virtual objects and/or virtual light sources; pre-processing the virtual scene (at a step 1110) by ray-tracing with respect to a virtual camera position to detect one or more virtual resources not required for ray-tracing rendering of at least an aspect of rendering the image (in other words, performing a culling process discussed above); and rendering (at a step 1120) the image by a ray-tracing process from the virtual camera position, the ray-tracing process being configured to omit ray-tracing for at least a given aspect of the image, with respect to the one or more virtual resources not required for ray-tracing rendering of at least the given aspect of the image.

Summary Apparatus FIG. 12 schematically illustrates an image rendering apparatus 1200 such as that described earlier operating in accordance with any of the above methods, the apparatus comprising:

a generator 1210 to generate a virtual scene comprising a set of virtual resources, the virtual resources being virtual objects and/or virtual light sources;

a pre-processor 1220 to pre-process the virtual scene by ray-tracing with respect to a virtual camera position to detect one or more virtual resources not required for ray-tracing rendering of at least an aspect of rendering the image; and a renderer 1230 to render the image by a ray-tracing process from the virtual camera position, the ray-tracing process being configured to omit ray-tracing for at least a given aspect of the image, with respect to the one or more virtual resources not required for ray-tracing rendering of at least the given aspect of the image.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. A method of rendering an image, the method comprising:
   generating a virtual scene comprising a set of virtual resources, the virtual resources being virtual objects and/or virtual light sources;
   pre-processing the virtual scene by ray-tracing with respect to a virtual camera position to detect one or more virtual resources not required for ray-tracing rendering of at least an aspect of rendering the image; and
   rendering the image by a ray-tracing process from the virtual camera position, the ray-tracing process being configured to omit ray-tracing for at least a given aspect of the image, with respect to the one or more virtual resources not required for ray-tracing rendering of at least the given aspect of the image, wherein:
   the pre-processing step comprises: (i) detecting, for each virtual light source, virtual objects which may be intersected by a ray emanating from that virtual light source, and (ii) storing BVH data indicative of any BVH nodes which are intersected by a ray emanating from that virtual light source;
   the generating step comprises generating a bounding volume hierarchy, BVH, defining bounding volumes around the virtual objects of the set of virtual resources; and
   the rendering step comprises: (i) for a given point of intersection of a ray with a given virtual object, emanating rays from that point, (ii) detecting any virtual light sources intersected by those rays, and (iii) omitting from the detection any light source not indicated by the stored BVH data, not to intersect the BVH node containing the given virtual object.

2. The method of claim 1, in which the pre-processing step is configured to detect one or more virtual resources not required for ray-tracing rendering from that virtual camera position by detecting, using ray-tracing, whether one or more virtual resources are visible from that virtual camera position.

3. The method of claim 2, in which the ray-tracing of the pre-processing step employs a lower density of rays than the ray-tracing of the rendering step.

4. The method of claim 2, in which the pre-processing step comprises storing visibility data indicating of any virtual resources which are visible from the virtual camera location.

5. The method of claim 4, in which the rendering step comprises performing the ray-tracing process in respect of those virtual resources indicated by the stored visibility data to be visible from the virtual camera location.

6. The method of claim 1, in which each lowest level leaf node of the BVH defines a bounding volume around a single respective virtual object, and higher level nodes of the BVH define bounding volumes around respective groups of virtual objects.

7. The method of claim 6, in which the pre-processing step comprises detecting, for each virtual light source, BVH nodes at a level higher than the leaf nodes which are intersected by a ray emanating from that virtual light source.

8. A non-transitory, machine-readable storage medium which stores computer software which, when executed by a computer, causes the computer to perform a method of rendering an image, the method comprising:
   generating a virtual scene comprising a set of virtual resources, the virtual resources being virtual objects and/or virtual light sources;
   pre-processing the virtual scene by ray-tracing with respect to a virtual camera position to detect one or more virtual resources not required for ray-tracing rendering of at least an aspect of rendering the image; and
   rendering the image by a ray-tracing process from the virtual camera position, the ray-tracing process being configured to omit ray-tracing for at least a given aspect of the image, with respect to the one or more virtual resources not required for ray-tracing rendering of at least the given aspect of the image, wherein:
   the pre-processing step comprises: (i) detecting, for each virtual light source, virtual objects which may be intersected by a ray emanating from that virtual light source, and (ii) storing BVH data indicative of any BVH nodes which are intersected by a ray emanating from that virtual light source;
   the generating step comprises generating a bounding volume hierarchy, BVH, defining bounding volumes around the virtual objects of the set of virtual resources; and
   the rendering step comprises: (i) for a given point of intersection of a ray with a given virtual object, emanating rays from that point, (ii) detecting any virtual light sources intersected by those rays, and (iii) omitting from the detection any light source not indicated by the stored BVH data, not to intersect the BVH node containing the given virtual object.

9. An apparatus comprising:

an image rendering apparatus, including:

a generator configured to generate a virtual scene comprising a set of virtual resources, the virtual resources being virtual objects and/or virtual light sources;

a pre-processor configured to pre-process the virtual scene by ray-tracing with respect to a virtual camera position to detect one or more virtual resources not required for ray-tracing rendering of at least an aspect of rendering the image; and a renderer configured to render the image by a ray-tracing process from the virtual camera position, the ray-tracing process being configured to omit ray-tracing for at least a given aspect of the image, with respect to the one or more virtual resources not required for ray-tracing rendering of at least the given aspect of the image, wherein:

the pre-processor operates to: (i) detect, for each virtual light source, virtual objects which may be intersected by a ray emanating from that virtual light source, and (ii) store BVH data indicative of any BVH nodes which are intersected by a ray emanating from that virtual light source;

the generator operates to generate a bounding volume hierarchy, BVH, defining bounding volumes around the virtual objects of the set of virtual resources;

the renderer operates to: (i) for a given point of intersection of a ray with a given virtual object, emanating rays from that point, (ii) detecting any virtual light sources intersected by those rays, and (iii) omitting from the detection any light source not indicated by the stored BVH data, not to intersect the BVH node containing the given virtual object.

10. The apparatus of claim 9, wherein the apparatus is a video game apparatus.

* * * * *